June 26, 1956 R. C. HILLIARD ET AL 2,752,576

TUNING MECHANISM FOR REFERENCE CAVITY RESONATORS

Filed May 23, 1955 2 Sheets-Sheet 1

INVENTOR.
ROBERT C. HILLIARD
JOHN E. BURR JR.
BY Edgar O. Rost
ATTORNEY

June 26, 1956 R. C. HILLIARD ET AL 2,752,576

TUNING MECHANISM FOR REFERENCE CAVITY RESONATORS

Filed May 23, 1955 2 Sheets-Sheet 2

*INVENTOR.*
ROBERT C. HILLIARD
JOHN E. BURR JR.
*BY* Edgar O. Rost
ATTORNEY

United States Patent Office 2,752,576

Patented June 26, 1956

2,752,576

TUNING MECHANISM FOR REFERENCE CAVITY RESONATORS

Robert C. Hilliard, Beverly Farms, and John E. Burr, Jr., Wenham, Mass., assignors to Bomac Laboratories Inc., Beverly, Mass., a corporation of Massachusetts Application May 23, 1955, Serial No. 510,089

7 Claims. (Cl. 333—83)

The present invention relates to temperature compensated reference cavity resonators and more particularly to such a device which incorporates novel tuning means for selection of a plurality of precise standard reference frequencies.

In prior art reference cavity resonators one fixed frequency is selected at the factory and the resonator will remain so tuned under all conditions of operation, such as vibration, pressure, humidity and temperature. Certain applications, such as radar systems for use on airplanes, ships and other mobile equipment may require more than one preselected frequency of operation. It is necessary, therefore, in such systems to employ a plurality of cavity resonators, each tuned to a different fixed frequency. Accordingly, it is an object of the invention to provide in a reference cavity resonator, novel tuning means to accurately select a plurality of fixed resonant frequencies.

A further object is to provide a novel tunable reference cavity resonator having a range of preselected resonant frequencies which will remain fixed tuned despite varied operating conditions.

The invention attains the objects enumerated by providing a means of transferring rotary motion into linear displacement of a tuning plunger to thereby change the resonant frequency. Since cavity resonators of the type to be described must be accurately tuned and temperature compensated, our invention provides for the positioning of a tuning plunger within a relatively high Q cavity of a metal selected for its low coefficient of expansion, desirably Invar. The movement of the plunger is accomplished by means of a tuning mechanism in cooperation with a spline, positioning cam, and pin arrangement. The resonant cavity structure is supported within a generally square-shaped block adapted for mounting in a hollow wave-guide system while the tuning mechanism is mounted very simply on said supporting block.

Other features and advantages of our invention will be evident after consideration of the following description and reference to the accompanying drawings, in which.

Figure 1:
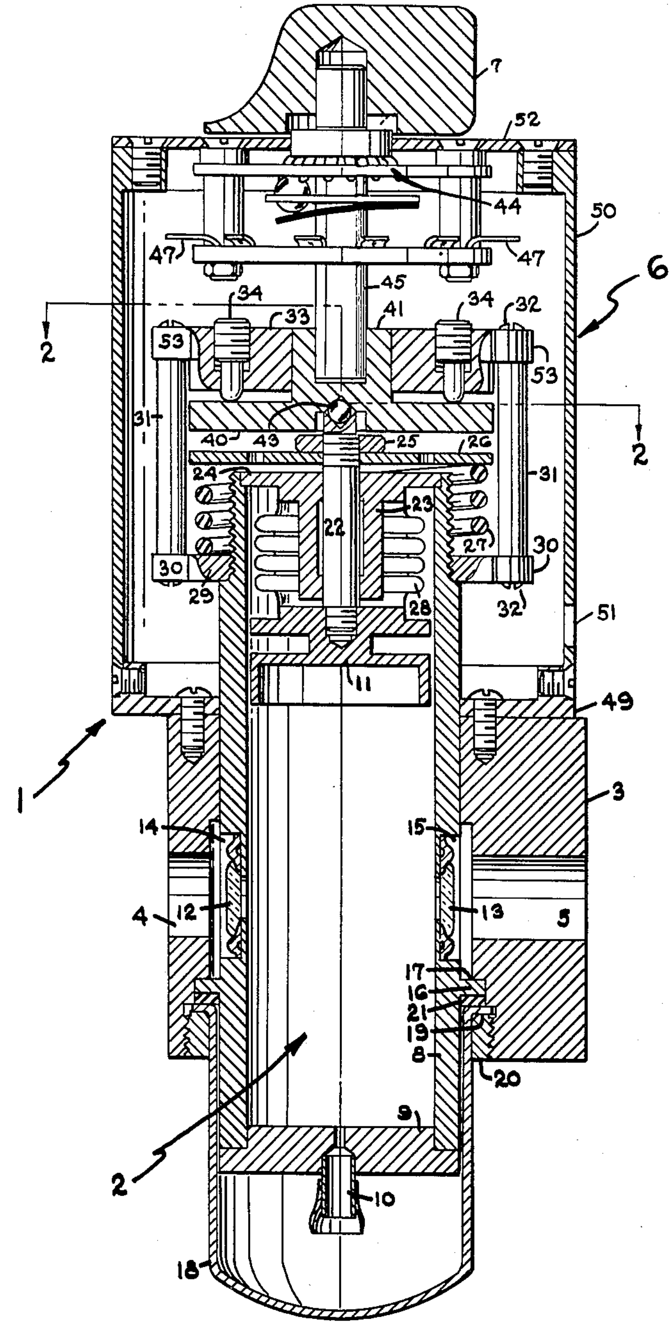
Fig. 1 is a vertical cross sectional view of the illustrative embodiment of the invention.
Figure 6:
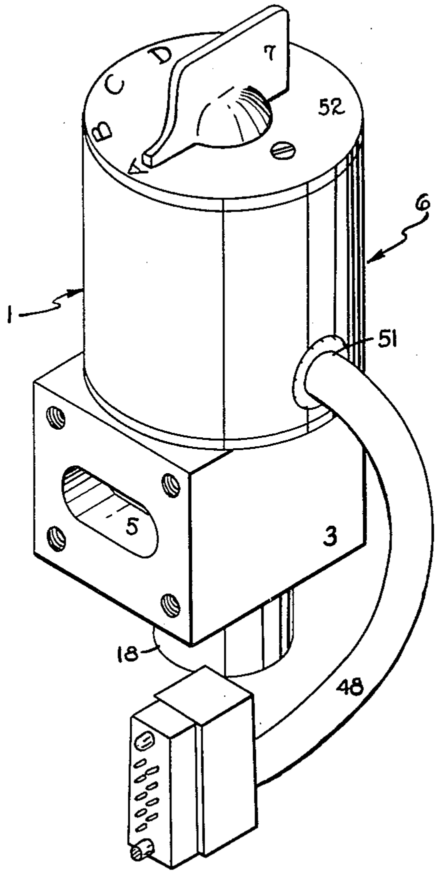
Fig. 6 is a perspective view of the illustrative embodiment.
Figure 2:
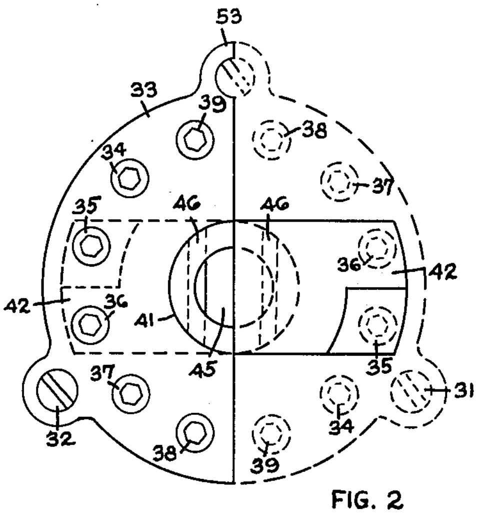
Fig. 2 is a sectional view along the line 2—2 in Fig. 1.
Figure 3:
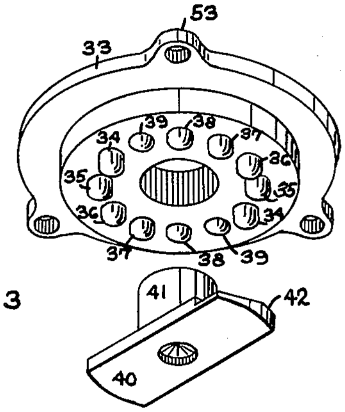
Fig. 3 is an exploded view of a portion of the tuning apparatus.

Referring to the drawings the illustrative embodiment of the invention 1 comprises a cylindrical resonant cavity 2 supported within a square metallic block 3 provided with substantially rectangular openings 4 and 5 adapted to be aligned with hollow waveguide structure secured to opposite sides of said block. The tuning mechanism 6 is mounted on said block 3 with tuning knob 7 exposed for external control.

The reference cavity resonator structure as shown in Fig. 1, includes a cylindrical body 8, desirably of the alloy Invar, having an end plate 9 of a similar material closing one end thereof. A metal tubulation 10 in end plate 9 provides means to evacuate the resonator and/or fill same with a suitable atmosphere such as dry air or any inert gas at any desired pressure. After processing, the tube 10 may be tipped off and sealed. The opposite end of the cavity defined by cylinder 8 is provided with a cylindrical hollow tuning plunger 11 which is axially adjustable to alter the length of the cavity to thereby determine the resonant frequency. Dielectric covered windows 12 and 13 are hermetically sealed in recesses 14 and 15 in cylinder 8 and are in alignment with rectangular openings 4 and 5 to provide for transmission of electromagnetic waves into and out of the cavity resonator.

Accurate positioning of the body 8 within block 3 is assured by flange 16 resting against shoulder 17. Protective cap 18 of a suitable metal, such as aluminum and having a lip 19, encloses the end of the resonator cylinder containing the exhaust tubulation 10 and is firmly supported by means of lock nut 20 in threaded engagement with block 3. Gasket ring 21 rests between flange 16 of the cylinder 8 and lip 19 to thereby prevent any displacement of the cavity positioning.

The tuning mechanism 6 encloses the other end of the cavity resonator and cooperates with the tuning plunger 11 to provide accurate positioning of said plunger to tune the device to a plurality of fixed resonant frequencies.

In the illustrative embodiment, a plunger shaft 22 extends axially within bearing 23 having a top plate 24 sealed to resonator body cylinder 8. Shaft 22 is threaded at its lower end to receive plunger 11 and at its upper end to receive adjusting nut 25. A spring pressure plate 26 is threaded on shaft 22 with spring 27 urging said plate upwards to axially move the tuning plunger 11. Nut 25 may be adjusted to the desired spring pressure bearing on plate 26.

A bellows 28 of a resilient metal such as beryllium copper may be secured as by welding or soldering to a shoulder on the upper part of the tuning plunger 11 and bearing 23 to make said resonator vacuum tight and still permit axial movement of the plunger.

The translation of rotary to axial movement is accomplished precisely by means of the structure shown in Fig. 2 to Fig. 5 as well as Fig. 1. A bottom support plate 29 having a plurality of lugs 30 is secured to the threaded end of resonator body cylinder 8 and remains stationary thereon. Struts 31 are secured to lug 30 by screws 32 and provide a means for temperature compensation to offset any variations in mechanical dimensions of the cavity due to the wide temperature range of operation from —55° C. to +85° C. For this purpose a metal such as Invar, steel or brass may be selected after suitable experimentation. Secured to the upper end of struts 31 by similar screw 32 is a pin support plate 33 with lugs 53 which is similarly stationary. A circular array of evenly spaced frequency adjustment pins 34—39 having a spherical tip surface extending below the bottom surface of support plate 33 are countersunk therein as shown. Similar pairs have been indicated with similar numbers. It may be noted that diametrically opposed pairs of pins are set to essentially the same dimensions, hence the difference in distance between the pins projecting the furthest namely 34 and the shortest namely 39 determines the length of travel of the tuning plunger 11 in and out of the cylinder 8. All adjustments to exact frequencies may be made very simply by adjusting the height of the pins.

Figure 5:
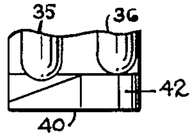
Fig. 5 is an enlarged fragmentary view of the tuning apparatus showing the principle of operation.
Figure 4:
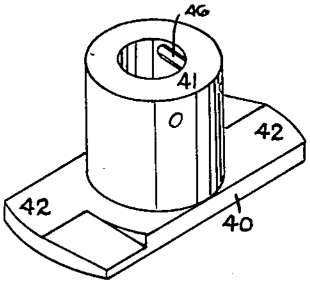
Fig. 4 is an enlarged perspective view of a component of the tuning assembly.

The rotary and axial motion is provided by a cam plate member 40 having two flat step portions 42 diametrically opposed to each other. As the cam plate 40 is rotated the incline or ramp of step 42 permits transference from one level to another continuously as shown in Fig. 5. Hence as the pins extend further downward rotation of plate 40 translates rotary motion into axial movement to overcome the pressure of spring plate 26 and thereby move plunger 11 inwardly. Conversely, shorter extensions will result in the tuning plunger being withdrawn. A ball pivot arrangement 43 provides for coupling of the cam plate member to the tuning plunger shaft 22. This method of connection is desirable since it permits complete freedom of orientation of the axis of the cam plate relative to the tuning plunger.

A simple detent switch mechanism 44 provided with a spline 45 extends into the hub 41 of cam plate member 40 and is loosely supported therein by means of pins 46 extending through the hub 41 and resting against the flat surfaces of spline 45. Other means of attachment to cooperate with the flat surface of the spline may be employed. The stationary pin support plate 33 is provided with a central opening into which the hub 41 may be loosely positioned to limit angular displacement of the cam plate member axis. Conductive tabs 47 arranged in a well-known manner around spline 45 may be electrically connected to a multi-pin plug and cable 48 to register on a suitably calibrated instrument panel the position of the tuning plunger and thereby indicate the tuned resonant frequency.

The complete tuning assembly may be enclosed by a housing comprising a support plate 49 suitably secured to the block 3 and cylinder 50 fastened to the peripheral wall of said support plate. An aperture 51 is provided for cable 48 electrically connected to tabs 47. Dial plate 52 suitably marked with any desired location index completes the housing and serves to indicate the position of the switch knob 7 fixed to the outer end of spline 45.

There is thus shown in the described embodiment a novel tuning mechanism for fixed tuned cavity resonators which is accurate, light and temperature compensated.

While an illustrative embodiment of the invention has been described, various modifications may occur to those skilled in the art. It is, therefore, our intention to cover in the appended claims such modifications as fall within the spirit and scope of the invention.

What is claimed is:

1. A reference cavity resonator adapted to be tuned to a plurality of fixed resonant frequencies which will remain substantially stable over a wide range of environmental and mechanical variations comprising a hollow conductive member closed at one end, a plunger member extending axially within said hollow member, tuning means cooperating with said plunger member to axially adjust the positioning thereof to a plurality of fixed predetermined values, said tuning means including upper and lower opposed stationary members separated by vertical supports with said lower member fixedly secured to the open end of said hollow member, said upper member having a plurality of axially adjustable means arranged in circular array therein with the ends of said adjusting means extending downwardly below said support member, a rotatable and axially movable member contacting the exposed ends of said adjusting means, said rotatable member being loosely coupled at a central point on its lower surface to said plunger member, a flat horizontal plate member positioned at an intermediate point between said plunger member and rotatable member, compressible means bearing against said plate member and lower stationary support member to urge said plunger member upwardly and a rotary detent switching mechanism cooperating with said rotatable member.

2. A tunable reference cavity resonator comprising a hollow cylinder of a conductive metal closed at one end, a tuning plunger cooperating with said cylinder end wall to define therein a resonant cavity, means for axially adjusting the positioning of said tuning plunger to a plurality of fixed dimensions which will remain substantially constant over a wide range of environmental and mechanical variations comprising an upper and lower cylindrical support plate separated by a plurality of vertical struts with said lower support plate in threaded engagement with the open end of said cylinder, a plurality of frequency adjustment pins arranged in circular array positioned in said upper support plate with the tips of said pins extending downwardly below the plane of said plate, a cam plate having a central hub section loosely fitted in a central opening in said upper support plate and wing sections contacting the exposed tips of said frequency adjustment pins, said cam plate having a recessed opening at a central point on its lower surface provided with a ball pivot, a shaft in threaded engagement at its lower end with said tuning plunger and contacting said ball pivot at its upper end, a flat plate horizontally disposed near the upper end of said shaft with a spring bearing against said flat plate and said lower support plate to thereby urge said tuning plunger upwardly and maintain said shaft in contact with said ball pivot and detent switching means cooperating with said cam plate to rotate said cam plate and axially move said tuning plunger.

3. A tunable reference cavity resonator according to claim 2, in which each pair of diametrically opposed adjustment pins extend downwardly a different predetermined dimension.

4. A tunable reference cavity resonator according to claim 2 wherein said hollow cylinder is selected from a metal having a low coefficient of expansion.

5. A tunable reference cavity resonator according to claim 2 wherein said vertical struts are selected from a metal whose coefficient of expansion will compensate for any variations in the cylinder metal.

6. A tunable reference cavity resonator according to claim 2 wherein said wing sections of said cam plate have a flat step portion contacting the frequency adjusting pins.

7. Tuning apparatus for reference cavity resonators to translate rotary motion into linear displacement of a tuning plunger extending axially within a resonant cavity to fixed predetermined dimensions to accurately tune said resonant cavity to fixed resonant frequencies substantially independent of temperature and mechanical variations comprising a rotatable and axially movable member having a flat step portion formed on opposed ends thereof, a stationary member having a plurality of adjustable pins disposed in circular array therein with the tips of said pins extending below the lower surface, diametrically opposed pairs of said pins being set at variable distances from the plane of said lower surface, the total limit of displacement of said tuning plunger being equal to the sum of the differences in the variable settings of said pins, said rotatable member contacting the exposed tips of said pins in the area of said inclined step portion, compressible means cooperating with said rotatable member to retain said member in contact with said pins and means for rotating said rotatable member to a plurality of fixed positions.

No references cited.